United States Patent [19]

Vannier

[11] Patent Number: 4,951,387
[45] Date of Patent: Aug. 28, 1990

[54] INSTALLATION FOR MOUNTING AND REMOVING SCREWS OF AN EXTRUSION MACHINE

[75] Inventor: Jean Vannier, Mesvres Etang sur Arroux, France

[73] Assignee: Clextral, Courbevoie, France

[21] Appl. No.: 324,145

[22] Filed: Mar. 15, 1989

Related U.S. Application Data

[62] Division of Ser. No. 127,998, Dec. 2, 1987, Pat. No. 4,839,955.

[30] Foreign Application Priority Data

Dec. 2, 1986 [FR] France .............................. 86 16817

[51] Int. Cl.$^5$ ............................................. B23P 19/00
[52] U.S. Cl. ............................................ 29/799; 29/700
[58] Field of Search ................ 29/700, 799, 281.1, 29/281.5

[56] References Cited

U.S. PATENT DOCUMENTS

| | | | |
|---|---|---|---|
| 2,807,080 | 9/1957 | Mathews, Sr. | 29/251 |
| 3,283,699 | 11/1966 | Hawkins | 100/214 |
| 3,908,258 | 9/1975 | Barty | 29/252 |
| 4,348,799 | 9/1982 | Lord | 29/450 |
| 4,685,628 | 8/1987 | Berrett | 241/260.1 X |
| 4,783,010 | 11/1988 | Kissel | 241/260.1 X |

FOREIGN PATENT DOCUMENTS

2560817  9/1985  France .

*Primary Examiner*—Timothy V. Eley
*Attorney, Agent, or Firm*—Pollock, Vande Sande & Priddy

[57] ABSTRACT

Apparatus for mounting and removing screws of an extrusion machine comprising two screws (10a, 10b) driven in rotation and guided at each of their ends by a bearing (1, 2). The screw-bearing assembly is placed on a work table (20) provided with adjustable devices (25, 26, 28) for supporting the screws, removing the bearings (1, 2) are removed and the sections (12) are successively extracted by means of suitable tooling and a section-hoisting device with respect to each screw separately. By means of a double section-hoisting device, a new section (12) is then simultaneously mounted on each splined shaft (11a, 11b) and the operation is repeated for each pair of new sections, placing back in position the bearing (1, 2) corresponding to each end of the shafts (11a, 11b) and lastly remounting the screw-bearing assembly in the extrusion machine.

10 Claims, 9 Drawing Sheets

INSTALLATION FOR MOUNTING AND REMOVING SCREWS OF AN EXTRUSION MACHINE

This is a division of application Ser. No. 127,998, filed Dec. 2, 1987, now U.S. Pat. No. 4,839,955.

FIELD OF THE INVENTION

The present invention relates to apparatus for mounting and removing screws of an extrusion machine.

BACKGROUND OF THE INVENTION

Extrusion machines are generally constituted by one or more screws driven in rotation inside an elongated sleeve in which are provided cylindrical bores for housing the screws. The latter are provided on their periphery with helical flights which drive in the downstream direction the material introduced through an upstream end of the sleeve. By acting on the pitch of the screws, the material can be subjected to different treatments, for example trituration, kneading or compression. The material is therefore driven to the downstream end of the sleeve which may be provided with an extrusion die or a simple outlet orifice in the case where the material does not have to be subjected to an extrusion.

In order to vary the treatment carried out in the course of the advance of the material through the sleeve, the screws are formed by successive regions having flights of different pitch and shapes. For example, conveying sections having a large pitch may be used or sections having a smaller pitch, or even the reverse arrangement for retarding and consequently compressing the material.

It is often necessary to modify the arrangement of the sections having different pitches, for example to change or adapt the treating procedure. Furthermore, the flights may deteriorated or be subjected to great wear, for example in the case where the conveyed material is particularly abrasive. This wear is of course greater in the most compressed regions.

Consequently, it is necessary to be able to change or replace certain sections of the screws.

For this purpose, the screws are usually formed by juxtaposed hollow sections mounted on a central shaft connected to a motor for driving the shaft in rotation. To ensure that the rotation of the shaft is transmitted to the screw sections, the latter are provided, on their inner wall, with grooves which are engaged with corresponding splines provided along the central shaft.

The distance between the axes and the guiding in rotation of the screws is usually ensured by a fixed bearing mounted at one of the ends of the shafts and by a floating bearing mounted at the other end.

Furthermore, the sleeve which surrounds said screws is constituted by a plurality of independent parts whose separation plane passes through the axis of the screws. This feature affords easy accessibility to the screws in position, which permits, among other things, checking of the surface of the flights, cleaning and repairs, and in particular the mounting and the removal of the screws.

Now, a complete screw which is constituted by sections stacked on the splined shaft represents a considerable weight.

Up to the present time, the mounting and the removal of the screws, and the replacement of the defective sections are carried out by equipment, which is maladapted and may result in the deterioration of the splines of the screw shafts when the sections are mounted and removed, and by a succession of long and fastidious operations.

SUMMARY OF THE INVENTION

An object of the present invention is therefore to provide a method which permits carrying out in a reliable and precise manner the mounting and the removal of the screw-bearing assembly and the replacement of the screw sections.

According to the invention, the method for mounting and removing the screws of an extrusion machine having two screws driven in rotation and guided at each of their ends by a bearing, each screw being formed by a central driving shaft on which are mounted a plurality of hollow sections provided on their inner wall with grooves which are engaged with corresponding splines of the central shaft and, on their periphery, with treating means such as helical flights, comprises:

(1) extracting with the aid of a hoisting means the screw-bearing assembly of the extrusion machine, and placing this assembly on a work table previously prepared for receiving simultaneously the two screws and provided with adjustable support means for said screws, (2) removing the bearings and placing in position on one of the ends of the two shafts a jig for locating the position of the splines and for maintaining the distance between the axes of the screws and, on the other end, a protective sleeve, (3) checking the dimensions of the flights of the screw sections for determining the defective sections to be repaired or replaced, (4) removing from the work table the screws and preparing said work table for placing in position a screw, (5) placing the first screw on the work table, proceeding to the successive extraction of the sections by means of a suitable tooling and a single section hoisting device, and then carrying out the same operation on the second screw, (6) then, after having withdrawn the second splined shaft from the work table, preparing said table for placing the two splined shafts in position, (7) placing the two splined shafts on the work table, and placing-back in position on one of their ends the jig for positioning said splined shafts relative to the original position of the splines, (8) simultaneously sliding by means of a double section hoisting device, a new section on each splined shaft, and repeating the operation for each pair of new sections, (9) removing the protective sleeve and the jig from each shaft, (10) putting the bearing corresponding to each end of the shafts back in position, and (11) effecting the remounting of the screwbearing assembly in the extrusion machine.

The method according to the invention is carried out by means of an installation comprising means for hoisting the screw-bearing assembly of the extrusion machine, a work table provided with adjustable means for supporting said screws, a unit for extracting the screw sections, a single section hoisting device for removing each section extracted from the splined shaft of the screw, and a double section hoisting device for simultaneously mounting a pair of new sections on the two splined shafts of the screws.

BRIEF DESCRIPTION OF THE DRAWINGS

Further features and advantages of the invention will be apparent from the following description, which is given with reference to the accompanying drawings, in which.

DESCRIPTION OF PREFERRED EMBODIMENT

Figure 1:
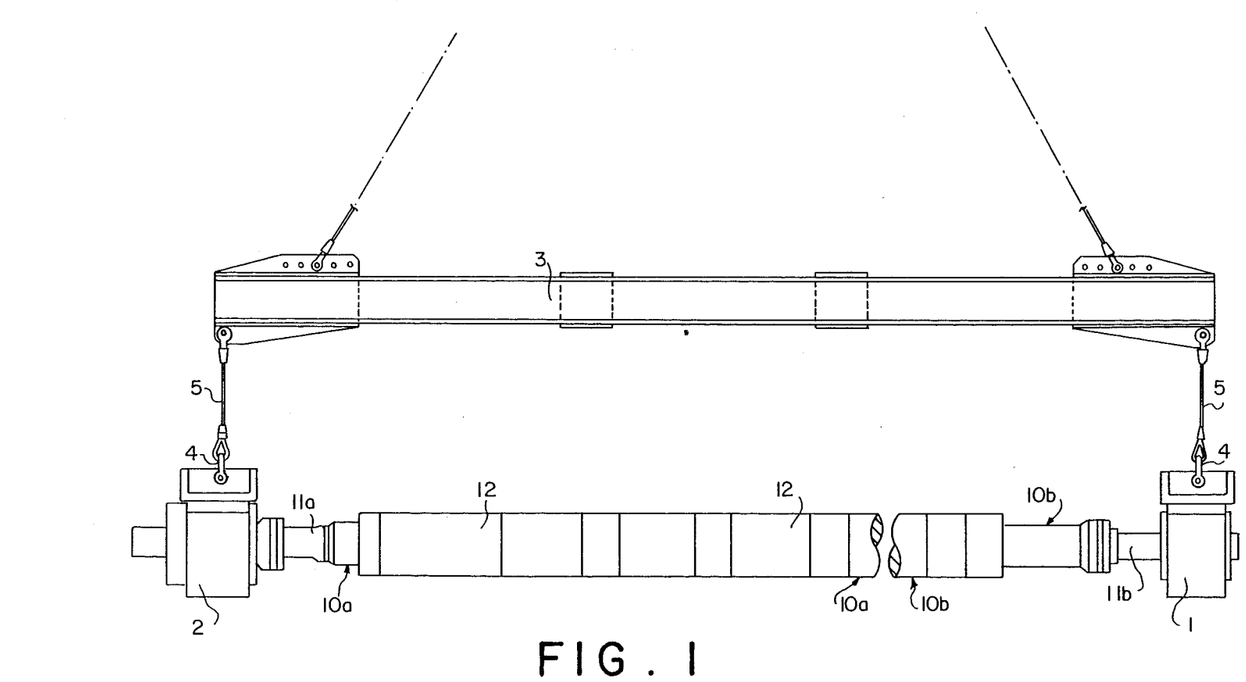
FIG. 1 is a diagrammatic view in side elevation and partly cut away of the screw-bearing assembly raised by a hoisting means.

With reference to FIG. 1, it can be seen that the screw-bearing assembly of an extrusion machine comprises two screws 10a and 10b, whose axes are parallel and which are interengaged and driven in rotation.

Each screw 10a and 10b is constituted by a number of juxtaposed sections 12, which are mounted on a shaft, respectively 11a and 11b, driven in rotation by driving means (not shown). For this purse, the screw sections 12 are provided with an inner bore on which are formed longitudinal grooves which are engaged with splines of the shafts 11a and 11b whereby the rotational torque can be transmitted to the screw sections.

The screws 11a and 11b are guided at one of the ends thereof by a floating bearing 1 and at the other end by a fixed bearing 2.

Figure 2:
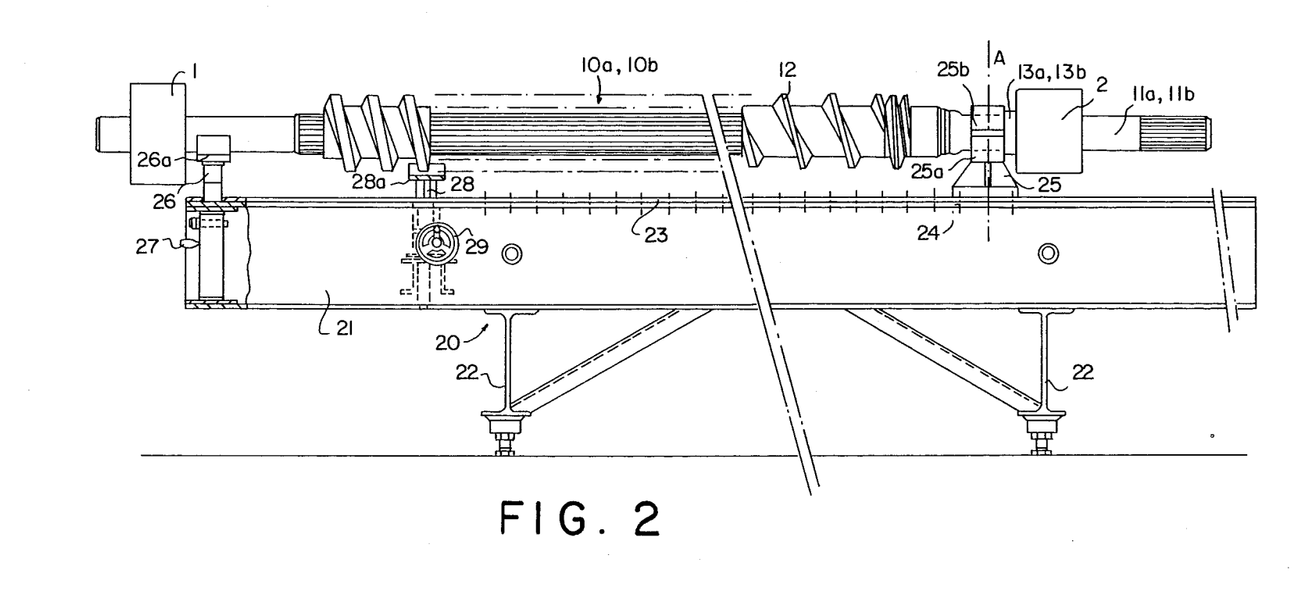
FIG. 2 is a side elevational view of a work table on which the screw-bearing assembly is placed.

For the purpose of dismantling or removing the screw-bearing assembly of the extrusion machine, the bearings 1 and 2 are hooked to a swing bar 3 by means of shackles 4 and slings 5, then this assembly is raised and transported to a work table 20 numeral 20 in (FIG. 2).

The work table 20 comprises a frame 21 supported on the ground by legs 22 and including a horizontal platform 23 on which are provided, throughout its length and on each side of the longitudinal axis, small apertures 24 for fixing the various devices in the various positions depending on the operations to be carried out, as will be explained hereinafter.

The work table 20 comprises, on one side, a first support 25 fixed to the horizontal surface 23 and having a position which is longitudinally adjustable owing to the provision of small apertures 24 and, on the other side, a second support 26 which is adjustable in height by a handling means 27. Further, the table 20 also includes an intermediate support 28 adjustable in height by a shifting means 29.

The supports 25, 26 and 28 may be provided with a double or single detachable head for the purpose of receiving the two screws 10a and 10b, at the same time or separately.

Figure 5:
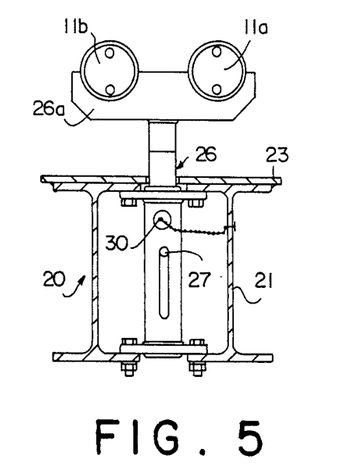
FIG. 5 is a sectional view taken on line 5—5 of FIG. 3.
Figure 6:
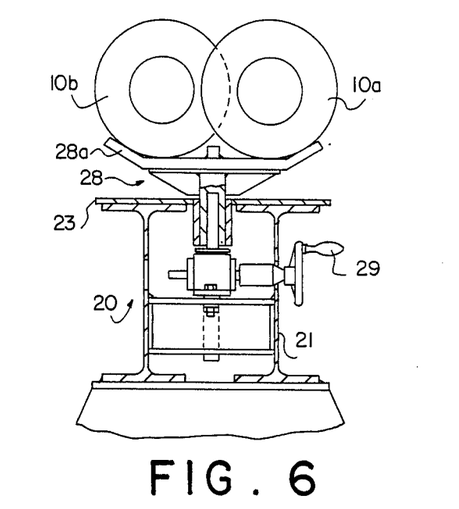
FIG. 6 is a sectional view taken on line 6—6 of FIG. 3.

Before placing the screw-bearing assembly on the work table 20, each support 25, 26 and 28 is provided with a double head, respectively 25a, 26a and 28a (FIGS. 5 to 7), and the support 26 is adjusted in height, locked in position by a pin 30, the support 28 is adjusted in a lower position and the support 25 is fixed in position A, such as that shown in FIG. 2.

Figure 7:
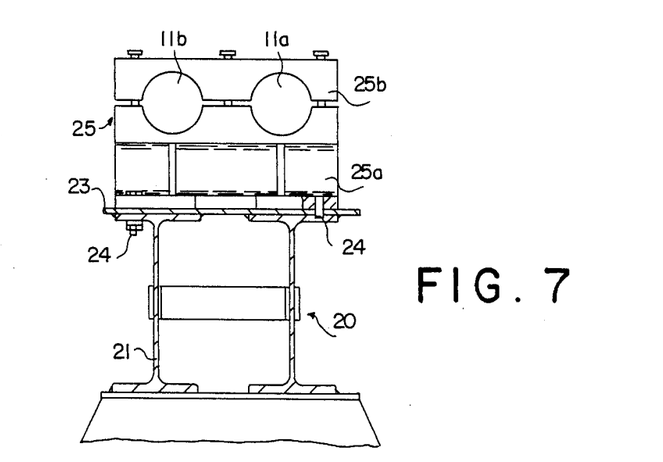
FIG. 7 is a sectional view taken on line 7—7 of FIG. 3.

After having carried out this preparation, the screw-bearing assembly is placed on the work table 20 in such manner that the ends of the shafts 11a and 11b bear in the cavities of the double heads 25a and 26a of the supports 25 and 26 and the lateral side of the flanges 13a and 13b of these shafts come into contact with the double head 25a. A cap 25b is then fixed on said double head 25a for maintaining the two screws in position (FIG. 7).

The floating bearing 1 and the fixed bearing 2 are now removed.

Figure 3:
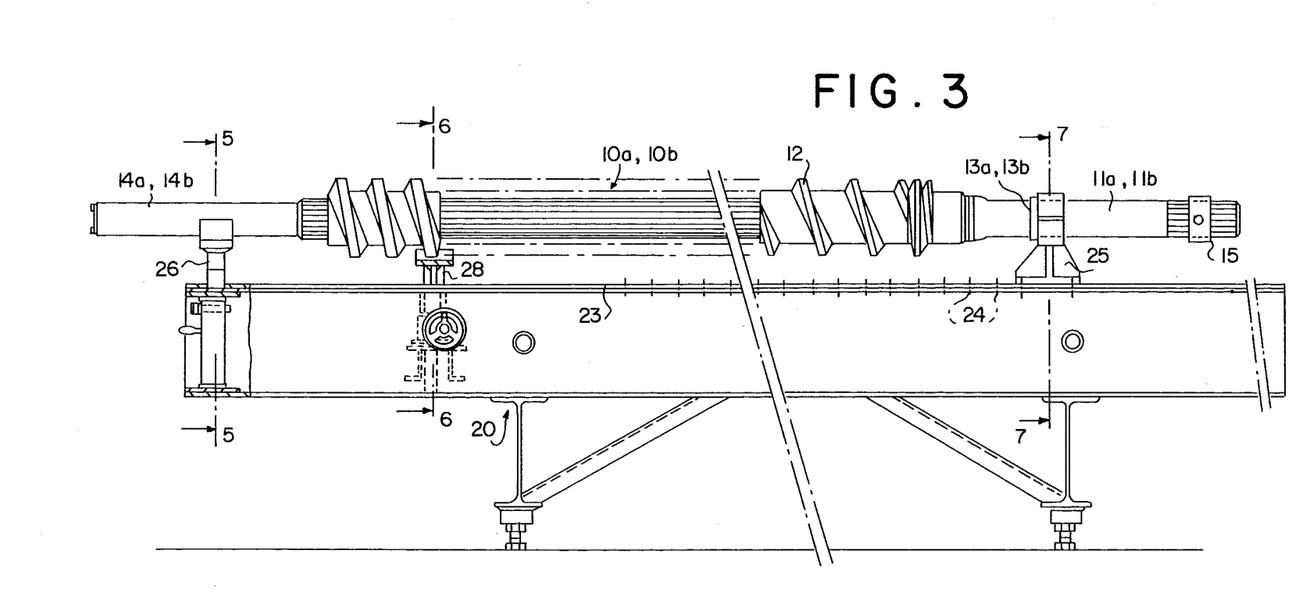
FIG. 3 a side elevational view of the work table with the two screws after the bearings have been removed.
Figure 4:
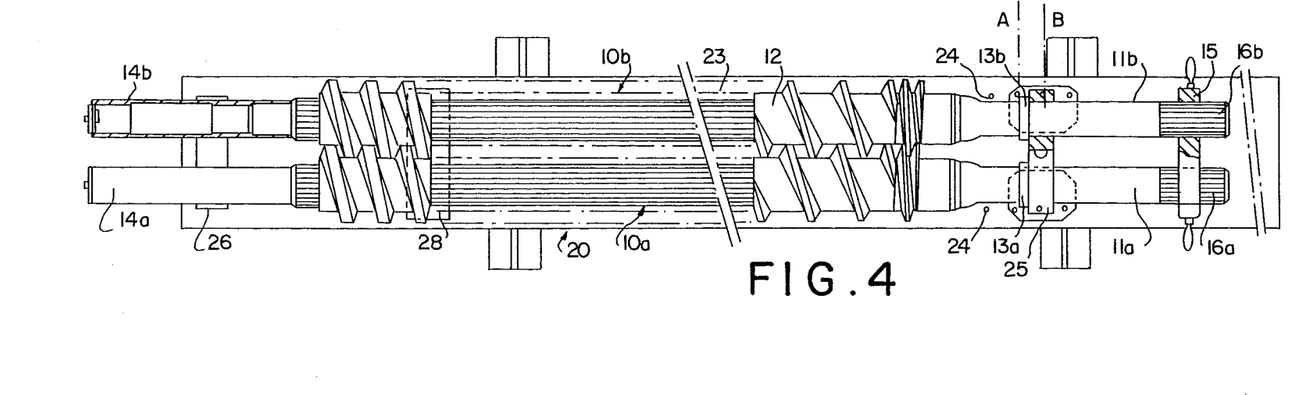
FIG. 4 is a top plan view of the table of FIG. 3.

As shown in FIGS. 3 and 4, when the removal of the bearings has been carried out, there is placed in position on the end of each shaft 11a and 11b, adjacent to the floating bearing, a protective sleeve 14a and 14b, each sleeve including an inner abutment and being screwed on the end of the shaft. Introduced in the other end of the shafts, adjacent to the fixed bearing, is a jig 15 having two inner and parallel bores in respect of which the distance between the axes corresponds to the distance between the axes of the shafts 11a and 11b. These inner bores include longitudinal grooves which are engaged with the splines 16a and 16b of the shafts 11a and 11b.

A cap 25b is removed from the support 25, the two screws 10a and 10b are raised by means of the jig 15, the support 25 is shifted so as to bring it to the position B on the other side of the flanges 13a and 13b, the screws are placed back on the support 25 and the cap 25b is again fixed in position.

Various operations for checking dimensions are then carried out on the screws 10a and 10b. These operations comprise in particular measuring by suitable means the diameter at the root of the flight, the outside diameter, and the clearance between the flight flanks, generally for the purpose of determining whether it is possible to recondition the sections or whether the defective sections must be replaced.

Further, the jig 15 gives the position of the splines 16a and 16b for the subsequent remounting.

After the various checking operations have been carried out, the jig 15 and the cap 25b are removed from the support 25, the screws 10a and 10b are separately removed and are stored away from the work table 20, and the table is prepared for the extraction of the section 12 of each extrusion screw.

Figure 8:
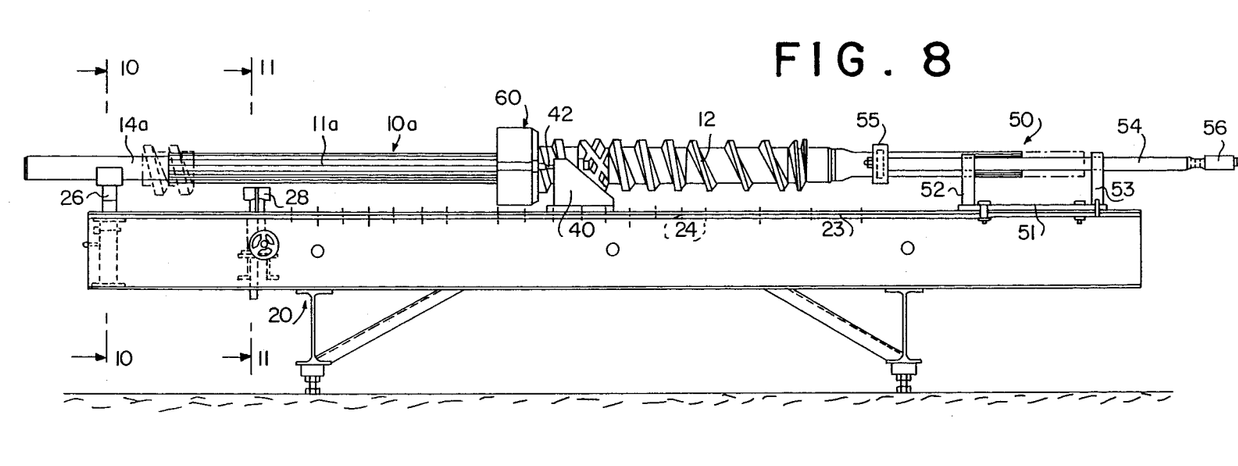
FIG. 8 is a side elevational view of the work table equipped for the extraction of the sections of a screw.
Figure 9:
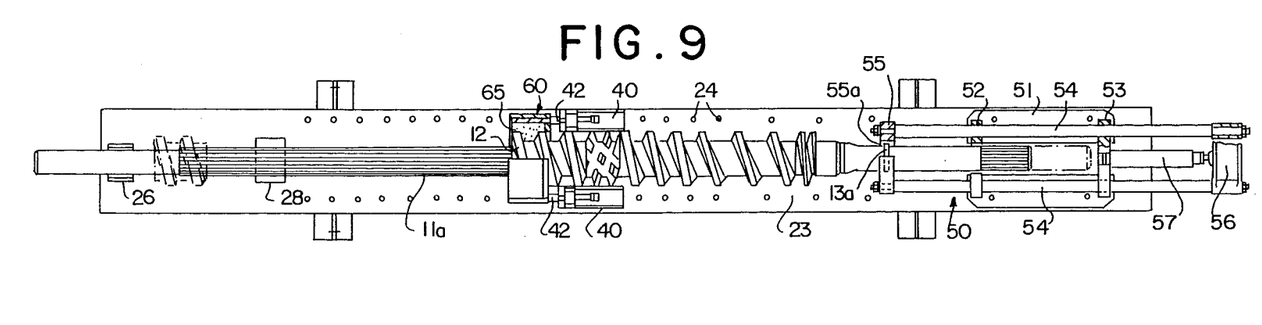
FIG. 9 is a top plan view of the table shown in FIG. 8.
Figure 10:
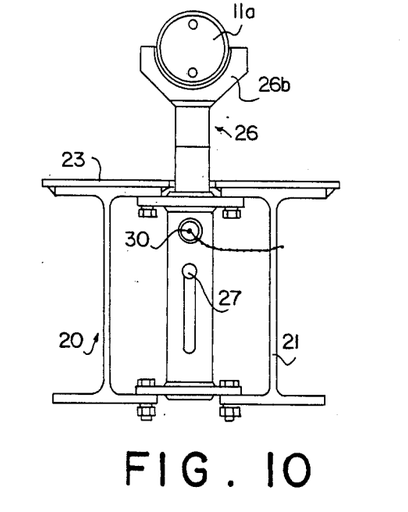
FIG. 10 is a sectional view taken on line 10—10 of FIG. 8.
Figure 11:
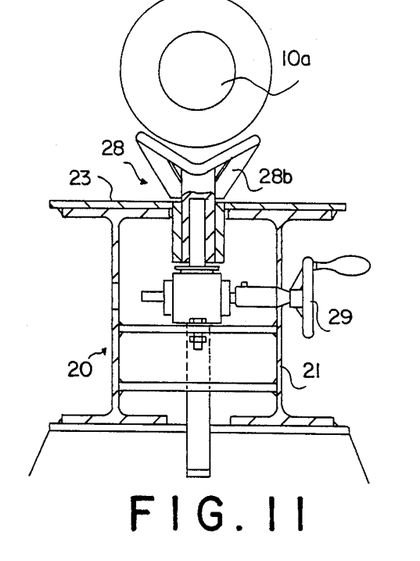
FIG. 11 is a sectional view taken on line 11—11 of FIG. 8.
Figure 12:
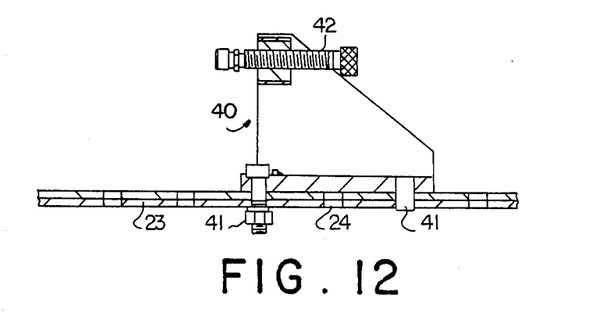
FIG. 12 is a sectional view of an abutment means for the extraction of a screw section.

For this purpose, the supports 26 and 28 are provided with a single head, respectively 26b and 28b (FIGS. 10 and 11), the support 26 is locked in the upper position by means of the pin 30, the support 28 being in the lower position, the support 25 is removed and the various screw section-extracting means are mounted on the horizontal platform 23 of the work table. These extracting means comprise two detachable squares or brackets 40 and a traction system 50 (FIGS. 8 and 9). The two brackets comprise, in their lower part, means 41 for fixing them in the small apertures 24 of the work table, and, in their upper part, a horizontal thrust screw 42 which is axially adjustable, at the height of the axis of the extrusion screw (FIG. 12).

The traction system 50 comprises a base 51 on which are fixed a support 52 including a central cavity for the shaft of the extrusion screw, and an abutment 53. This system also includes, on each side of the central axis, two longitudinal and parallel tie bars 54. The two tie bars 54 are slidable in the support 52 and in the abutment 53 and are interconnected at one of their ends by a ring 55 provided with an inner recess 55a for receiving the flange 13a or 13b of the extrusion screws, and at their other end by an abutment 56. A jack 57 is mounted between an abutment 53 connected to the base 51 and the abutment 56 connected to the two tie bars 54.

FIGS. 8 and 9 show by way of example the extraction of a section located in the central part of the screw, it being assumed that the preceding sections have already been extracted. The extracting operation described hereinafter is identical for all the screw sections.

To achieve the extraction of the sections, there are first of all mounted on the work table the two brackets 40 in a temporary position, and then the traction system 50.

Figure 14:
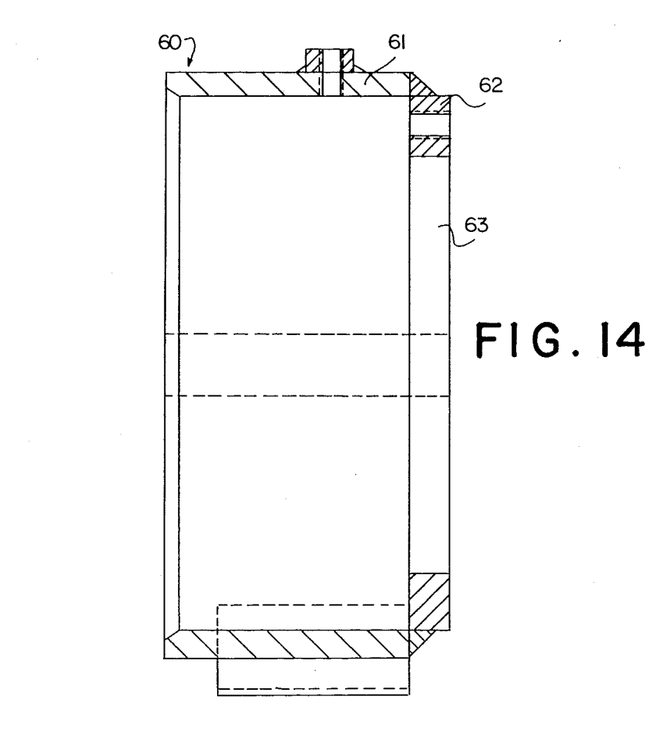
FIG. 14 is a sectional view of the shell carrier.

Thereafter, the first extraction screw 10a is positioned on the table in such manner that the splined shaft 11a bears, on one side on the support 26 and, on the other side, the flange 13a is placed in the cavity 55a of the ring 55. The tie bars 54 support, through the ring 55, the weight, adjacent to the fixed bearing, of the shaft 11a, which may or may not be equipped with screw elements 12. Consequently, there is no friction between the shaft 11a and the support 52 of the extracting system 50. Mounted on the end of the splined shaft 11a, adjacent to the support 26, is a protective sleeve 13a, a shell carrier 60 (FIG. 14) constituted by a cylindrical frame 61 including, on one of its sides, a small ledge 62 provided with a central orifice 63 for the passage of the screw 10a.

Figure 13:
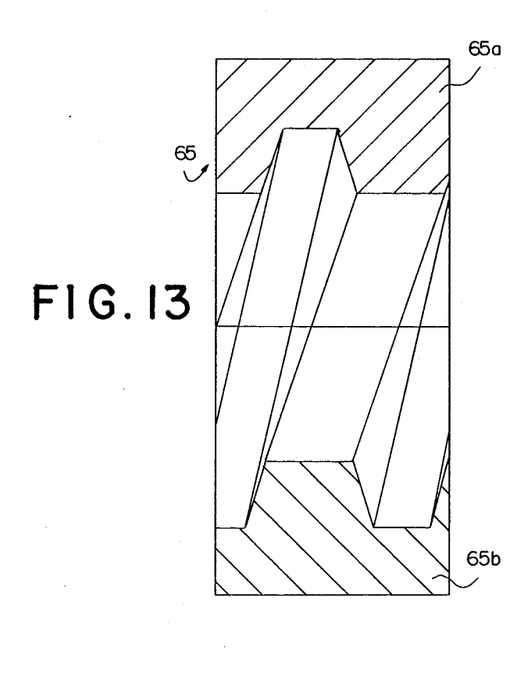
FIG. 13 is a sectional view of the two semi-shells for the extraction of a screw section.

For the purpose of introducing this shell carrier 60, the support 28 is raised, in order to maintain the screw 10a, the support 26 is lowered, the shell carrier 60 is slid between the two supports 26 and 28, then the support 26 is raised, the support 28 is lowered and said shell carrier is slid on the screw section 12. Placed in position on the section to be extracted is a shell 65 formed by two semi-shells 65a and 65b obtained from a composite material (FIG. 13). This shell has an inside profile identical to the profile of the flights of the screw section to be extracted.

After having placed the two semi-shells in position on the section, by fitting the shell carrier 60 on the semi-shells, the two brackets 40 are fixed on the work table 20 just behind the shell carrier, and the screws 42 of said brackets are brought into contact on the ledge 62 of the shell carrier.

These various preparing operations having been terminated, a supply unit (not shown) is connected to the jack 57 and the latter is put under pressure.

The jack 57 exerts a thrust on the abutment 56, and this exerts a traction on the shaft 11a of the extrusion screw through the tie bars 54, the ring 55 and the flange 13a. The section 12 to be extracted is locked in position by the shell carrier 60 and the brackets 40, and the shaft 11a slides under the action of the jack 57 and thus causes the unblocking of said section relative to the splines of the shaft. By returning the jack 57 to the initial position, the shaft 11a slides in the opposite direction and the section 12 moves away from the screws 42 of the brackets 40.

Thereafter, it is sufficient to dismantle the shell carrier 60 and the shell 65 and then slide the section 12 to bring it between the supports 26 and 28.

Figure 15:
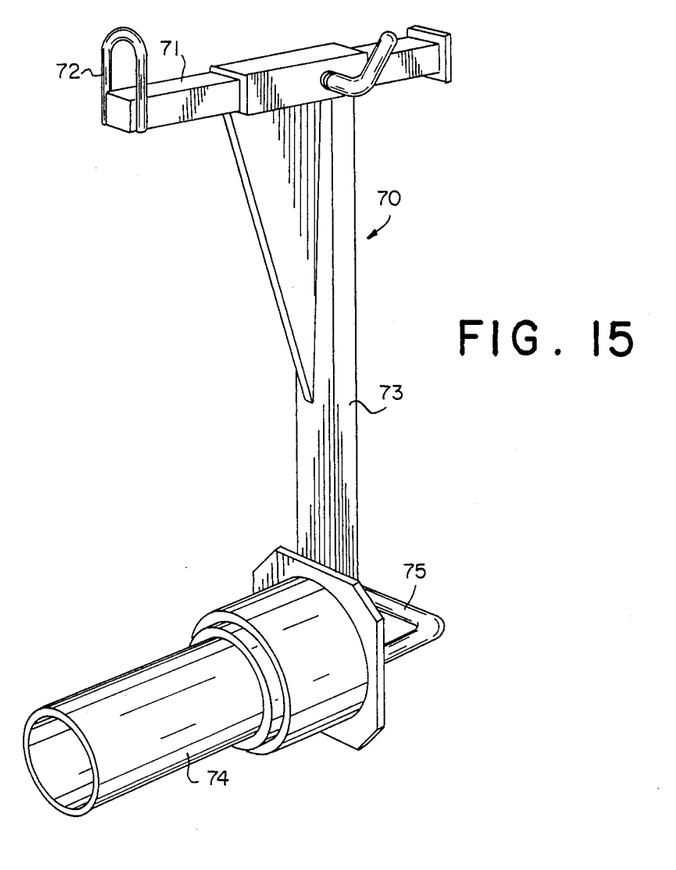
FIG. 15 is a perspective view of a single section-hoisting device.

The removal of the section 12 is effected by means of a simple section-hoisting device 70, such as that shown in FIG. 15.

This single section-hoisting device 70 comprises a horizontal arm 71 provided with a hook 72 and carrying a vertical stem 73. The vertical stem 73 includes, in its lower part, on one hand, a cylinder 74 having the same diameter as the protective sleeves 14a fitted on the shaft 11a of the extrusion screw and, on the other hand, a grasping handle 76.

For the purpose of removing the section 12, the single section-hoisting device 70 is hooked to some hoisting means by means of the hook 72 and is placed at the end of and in alignment with the shaft 11a. The support 28 is raised, the support 26 is lowered and the section 12 is made to slide so as to bring it onto the cylinder 74 of the section-hoisting device 70. The section to be extracted is transported to a work station for possible reconditioning, or to a storing zone.

These operations are repeated for each section to be extracted from the screw 10a, and are also repeated for the second screw 10b.

The inverse operations of pressing the screw sections back in position on the two splined shafts are carried out in the following manner.

First of all, the supports 26 and 28 are provided with the double head 26a and 28a (FIGS. 5 and 6) and the support 25 is placed back on the work table 20 in the position B (FIG. 3). The two splined shafts 11a and 11b are so positioned that they rest on the supports 26 and 28, and the flange 13a and 13b of each shaft is in bearing relation to the lateral surface of the support 25. The splined shafts are oriented relative to the original position of the splines, previously located, and the jig 15 is mounted on the end of the shafts adjacent to the fixed bearing. Cap 25b is then fixed on the support 25, which locks the the shafts 11a and 11b in position.

Figure 16:
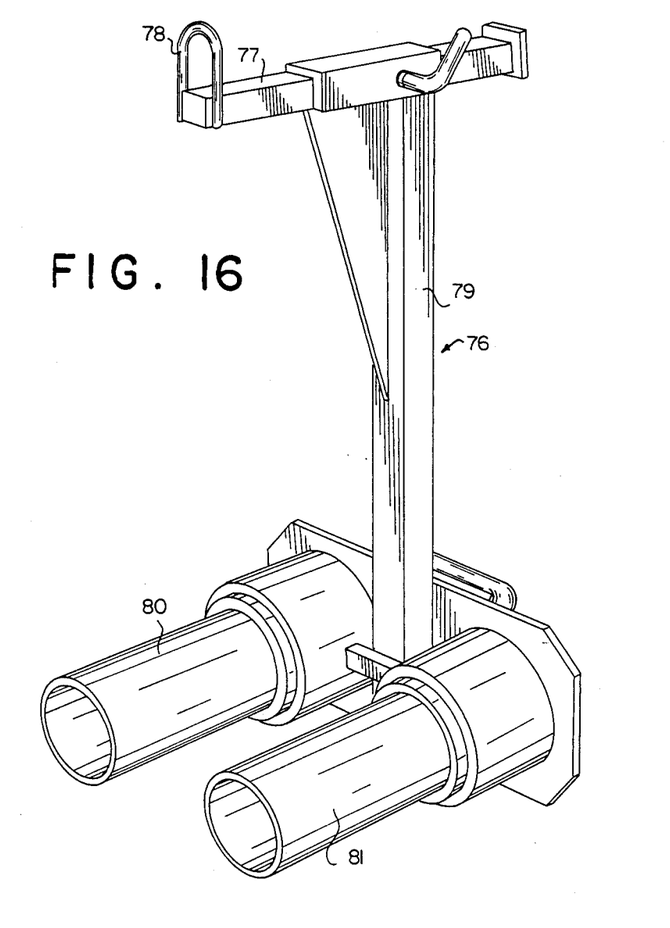
FIG. 16 is a sectional view of a double section hoisting device.

The screw sections are remounted on the splined shafts 11a and 11b by using a double section-hoisting device 76 such as that shown in FIG. 16. This device comprises the single section-hoisting device, a horizontal arm 77, a hook 78 and a vertical stem 79. However, in this case the vertical stem 79 supports two parallel cylinders 80 and 81 whose outside diameters correspond to the outside diameters of the protective sleeves 14a and 14b. When the sections 12 are mounted, a section is mounted on each cylinder 80 and 81 and the section-hoisting device 76 is placed at the end of and in the alignment with the shafts 11a and 11b. The support 28 is raised and the support 26 is lowered, and then a new section is simultaneously slid on each splined shaft 11a and 11b between the supports 26 and 28. Now support 26 is raised and the support 28 lowered, and the pair of interengaging sections is slid into position on the splined shafts and the operation is repeated for each pair of new sections.

When all the sections have been remounted and axially clamped by nuts screwed on the two shafts, the support 25 is put back into the position A (FIG. 2), the support 28 is raised and the support 26 lowered, and the protective sleeves 14a and 14b and the jig 15 are removed.

The last operation comprises remounting on the screws 10a and 10b the fixed bearing 2, then the floating bearing 1, and lastly replacing the screw-bearing assembly in the extrusion machine by means of the swing bar 3.

This succession of operations permits the mounting and the dismantling of the screw bearing assembly of an extrusion machine of large size and great weight and the replacement of the screw sections with rapidity and precision. Furthermore, the design of this assembly is such that the replacement of the sections precludes any risk of tilting the screw section, which avoids, among other things, deterioration of the splines, and is carried out with great flexibility.

Indeed, with this assembly and with two sets of shafts, it is possible to prepare in advance a complete pair of replacement screws, to carry out at the required moment solely the permutation between the worn and renewed screws. This operation involves only the handling of the screw-bearings assembly, the removal from and the remounting of the bearings relative to the new screws. The intervention is therefore very short relative to the reconditioning of a pair of screws, and results in a minimum machine down time.

What is claimed is:

1. Apparatus for selectively mounting and removing screws of an extrusion machine which comprises two screws driven in rotation and guided at opposite ends thereof by a bearing forming with the screws a screw-bearing assembly, each screw comprising a central driving shaft having splines, a plurality of hollow screw sections mounted on the driving shaft and having an inner wall defining grooves which are in engagement with the splines of the central shaft, and extrusion treating means on the periphery of the screw sections, said installation comprising means for hoisting the screw-bearing assembly of the extrusion machine, a work table provided with adjustable support means for said screws, a unit for withdrawing the screw sections from the respective shaft, a single section-hoisting device for removing each screw section withdrawn from the shaft, and a double section-hoisting device for simultaneously mounting a new section on the two splined shafts.

2. Apparatus according to claim 1, wherein the work table has a longitudinal axis and comprises a horizontal platform on which are provided throughout its length and on each side of said longitudinal axis small apertures for positioning the support means and the unit for withdrawing the screw sections on the Platform at different locations.

3. Apparatus according to claim 1, wherein the support means are adjustable in height and the support means are provided selectively with a double head for receiving the two screws and a single head for receiving a single screw.

4. Apparatus according to claim 1, wherein the screw section withdrawing unit comprises a shell having an inner profile corresponding to the outer profile of the screw section to be withdrawn, a shell carrier for the shell, at least two abutment elements and a traction system for exerting a traction on the shaft of the screw.

5. Apparatus according to claim 4, wherein the shell is formed by at least two semi-shells made from a composite material.

6. Apparatus according to claim 4, wherein each abutment element comprises a bracket having at a base thereof means for fixing the bracket in said small apertures of the work table and in an upper part of the bracket a horizontal thrust screw adjustable axially of the table.

7. Apparatus according to claim 4, wherein the traction system comprises a base provided with a vertical support for the splined shaft of the extrusion screw and a first abutment, said traction system further comprising two longitudinal and parallel tie-bars, a second abutment interconnecting first ends of the tie-bars and a ring interconnecting second ends of the tie-bars opposed to said first ends.

8. Apparatus according to claim 7, wherein a jack is interPosed between the first abutment and the second abutment.

9. Apparatus according to claim 8, wherein the ring has an inner cavity for receiving a flange provided on the splined shaft for transmitting to said splined shaft the traction force under the action of the jack and the two tie-bars.

10. Apparatus according to claim 1, wherein the single section-hoisting device comPrises a cylinder having an outside diameter which corresPonds to the inside diameter of the screw sections and the double section-hoisting device comprises two parallel cylinders having outside diameters which corresPond to the inside diameter of the screw sections.

* * * * *